US012803435B2

(12) United States Patent
Tanji

(10) Patent No.: US 12,803,435 B2
(45) Date of Patent: Nov. 17, 2026

(54) SWITCHING REGULATOR PROVIDED WITH A PAIR OF SWITCH ELEMENTS CONNECTED IN SERIES TO EACH OTHER

(71) Applicant: NISSHINBO MICRO DEVICES INC., Tokyo (JP)

(72) Inventor: Kagehito Tanji, Ikeda (JP)

(73) Assignee: NISSHINBO MICRO DEVICES INC., Tokyo (JP)

( * ) Notice: Subject to any disclaimer, the term of this patent is extended or adjusted under 35 U.S.C. 154(b) by 145 days.

(21) Appl. No.: 18/870,101

(22) PCT Filed: Jun. 16, 2022

(86) PCT No.: PCT/JP2022/024168
§ 371 (c)(1),
(2) Date: Nov. 27, 2024

(87) PCT Pub. No.: WO2023/243050
PCT Pub. Date: Dec. 21, 2023

(65) Prior Publication Data
US 2026/0254355 A1 Aug. 27, 2026

(51) Int. Cl.
*H02M 3/156* (2006.01)
*H02M 1/00* (2006.01)

(52) U.S. Cl.
CPC ......... *H02M 3/156* (2013.01); *H02M 1/0009* (2021.05)

(58) Field of Classification Search
CPC .......................................... H02M 3/155-1588
See application file for complete search history.

(56) References Cited

U.S. PATENT DOCUMENTS

2009/0140708 A1* 6/2009 Tateishi .............. H02M 3/1588 323/282
2012/0105029 A1 5/2012 Kawagoe
(Continued)

FOREIGN PATENT DOCUMENTS

JP 2001-095235 A 4/2001
JP 2012-095444 A 5/2012
(Continued)

OTHER PUBLICATIONS

Dec. 26, 2024 Notification Of Transmittal of Translation of the International Preliminary Report on Patentability (IPRP) in connection with PCT/JP2022/024168.
(Continued)

*Primary Examiner* — Peter M Novak

(57) ABSTRACT

A switching regulator according to the present invention includes: a comparator that compares a switching voltage corresponding to an inductor current flowing from the switching regulator to an inductor with a predetermined reference voltage, and outputs a comparison result signal; a monitoring circuit that generates a current for generating a monitoring voltage that monitors the switching voltage; a reference voltage circuit that generates a current for generating the reference voltage; and a control circuit that outputs a plurality of selection signals indicating a plurality of mutually different timings to at least one of the monitoring circuit and the reference voltage circuit. At least one of the monitoring circuit and the reference voltage circuit changes the generated current according to the plurality of timings, and at least one of the monitoring circuit and the reference voltage circuit is shared for the plurality of timings.

5 Claims, 24 Drawing Sheets

(56) References Cited

U.S. PATENT DOCUMENTS

| | | | | |
|---|---|---|---|---|
| 2017/0257028 | A1 | 9/2017 | Kawano et al. | |
| 2020/0366189 | A1 | 11/2020 | Yamanaka | |
| 2022/0255435 | A1 * | 8/2022 | Yoon ......................... | H02J 7/80 |

FOREIGN PATENT DOCUMENTS

| | | | |
|---|---|---|---|
| JP | 6656956 | B2 | 3/2020 |
| WO | 2019/146209 | A1 | 8/2019 |

OTHER PUBLICATIONS

International Search Report dated Aug. 9, 2022 in connection with PCT/JP2022/024168.

* cited by examiner

BASIC CIRCUIT

FIRST MODIFIED EMBODIMENT

SECOND MODIFIED EMBODIMENT

THIRD MODIFIED EMBODIMENT

FOURTH MODIFIED EMBODIMENT

COMPARATIVE EXAMPLE

FIRST EMBODIMENT

SECOND EMBODIMENT

THIRD EMBODIMENT

FOURTH EMBODIMENT

FIFTH EMBODIMENT

SIXTH EMBODIMENT

SEVENTH EMBODIMENT

EIGHTH EMBODIMENT

SWITCHING REGULATOR PROVIDED WITH A PAIR OF SWITCH ELEMENTS CONNECTED IN SERIES TO EACH OTHER

CROSS-REFERENCE TO RELATED APPLICATIONS

This U.S. patent application is a Section 371 National Stage of International Application No. PCT/JP2022/024168, filed Jun. 16, 2022.

TECHNICAL FIELD

The present invention relates to a switching regulator.

BACKGROUND ART

In the switching regulator according to the prior art, it has been already known that miniaturization of an integrated circuit (IC) is also required in order to reduce a mounting area.

For example, Patent Document 1 discloses a switching regulator according to a conventional example in order to operate a plurality of abnormality detection functions of a switching regulator with low power consumption and to reduce an occupied area in a semiconductor device. The switching regulator includes a comparison circuit, a plurality of switch circuits, and a switch control circuit, switches the plurality of switch circuits by a plurality of control signals of the switch control circuit, and realizes the plurality of abnormality detection functions by one comparison circuit.

That is, in order to reduce the chip area, Patent Document 1 discloses a technique in which, for example, a reference voltage and a monitoring voltage of a plurality of detection circuits having different operation timings are switched and one comparator circuit is used in common.

PRIOR ART DOCUMENT

Patent Document

Patent Document 1: Japanese patent No. JP6656956B2.

SUMMARY OF THE INVENTION

Problems to be Solved by the Invention

However, conventional switching regulators for analog circuits require a circuit that corrects manufacturing variations in electrical characteristics and specific accuracy in order to maintain high quality and high stability, and have such a problem that it is difficult to reduce the circuit area. In particular, in the invention according to Patent Document 1, the problem that a circuit for correcting manufacturing variations is required for each application has not been solved.

An object of the present invention is to solve the above problems and to provide a switching regulator that can reduce a circuit area in the switching regulator as compared with the prior art while maintaining high quality and high stability.

Solutions to the Problems

According to one aspect of the present invention, a switching regulator is provided to include a pair of switch elements connected in series to each other. The switching regulator includes a comparator, a monitoring circuit, a reference voltage circuit, and a control circuit. The comparator is configured to compare a switching voltage corresponding to an inductor current flowing from the switching regulator to an inductor with a predetermined reference voltage, and output a comparison result signal, and the monitoring circuit is configured to generate a current for generating a monitoring voltage for monitoring the switching voltage. The reference voltage circuit is configured to generate a current for generating the reference voltage, and the control circuit is configured to generate and output a plurality of selection signals indicating a plurality of timings different from each other to at least one of the monitoring circuit and the reference voltage circuit. A least one of the monitoring circuit and the reference voltage circuit changes the generated current in accordance with the plurality of timings, and at least one of the monitoring circuit and the reference voltage circuit is shared for the plurality of timings.

Effects of the Invention

Therefore, according to the switching regulator according to an aspect of the present invention, it is possible to reduce the circuit area in the switching regulator as compared with the prior art while maintaining a high and stable quality.

DETAILED DESCRIPTION

Figure 1:
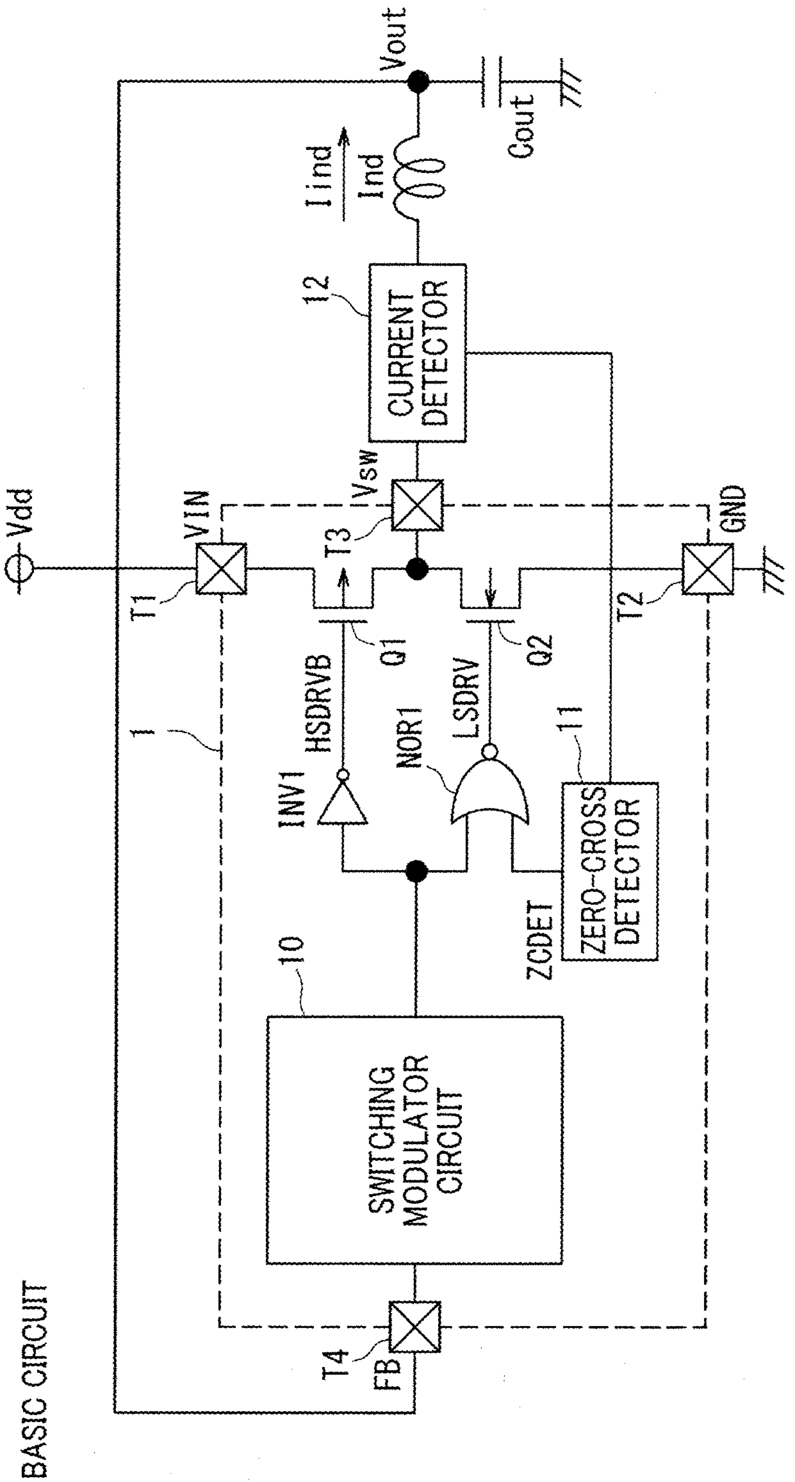
FIG. 1 is a block diagram illustrating a configuration of a switching regulator 1 according to a basic circuit.

Hereinafter, embodiments and modified embodiments according to the present invention will be described with reference to the drawings. Note that the same or similar components are denoted by the same reference numerals.

Findings of Inventors

First of all, in order to describe the problem of the present invention, a basic circuit will be described below.

Basic Circuit

FIG. 1 is a block diagram illustrating a configuration of a switching regulator 1 according to a basic circuit. In FIG. 1, a switching regulator 1 is configured to include a switching modulator circuit 10, an inverter INV1, a NOR gate NOR1, a zero-cross detector 11, MOS transistors Q1 and Q2 which are a pair of switch elements, and terminals T1 to T4.

Referring to FIG. 1, the switching modulator circuit 10 generates, for example, a PWM signal for switching the MOS transistors Q1 and Q2 configuring the inverter circuit based on the output voltage Vout fed back to the terminal T4 so that the output voltage Vout becomes a predetermined value, outputs the PWM signal to the gate of the MOS transistor Q1 via the inverter INV1, and outputs the PWM signal to the gate of the MOS transistor Q2 via the NOR gate NOR1 to switch the MOS transistors Q1 and Q2. The power supply voltage Vdd is grounded via the terminal T1, the source and drain of the MOS transistor Q1, the drain and source of the MOS transistor Q2, and the terminal T2. The output voltage from each drain of the MOS transistors Q1 and Q2 is output to the output capacitor Cout as an output voltage Vout via the terminal T3, the current detector 12, and the inductor Ind. In this case, the output voltage Vout is fed back to the terminal T4.

The current signal corresponding to the inductor current Iind detected by the current detector 12 is input to the zero-cross detector 11, and the zero-cross detector 11 generates the zero-cross detection signal ZCDET having the H level, and outputs the same to the NOR gate NOR1 each time zero is crossed.

The basic circuit of FIG. 1 configured as described above is shown by a diagram for describing the basic operation of monitoring the inductor current Iind, and in particular, the basic circuit is characterized in that the zero-cross detector 11 detects that the inductor current during rectification becomes zero and controls the switching operation. Specifically, in FIG. 1, in response to the zero-cross detection signal ZCDET having the H level, the switching operation is stopped in order to prevent the reverse flow of the current.

Next, modified embodiments of the basic circuit will be described below.

First Modified Embodiment

Figure 2:
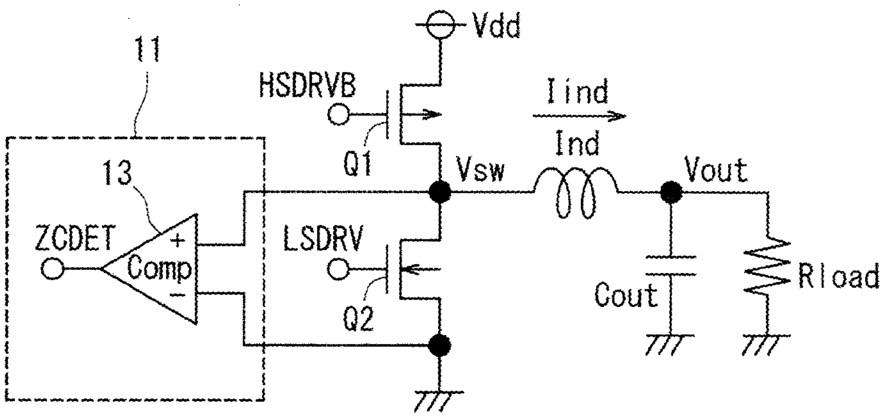
FIG. 2 is a block diagram illustrating a configuration of a zero-cross detector 11 of FIG. 1.
Figure 3:
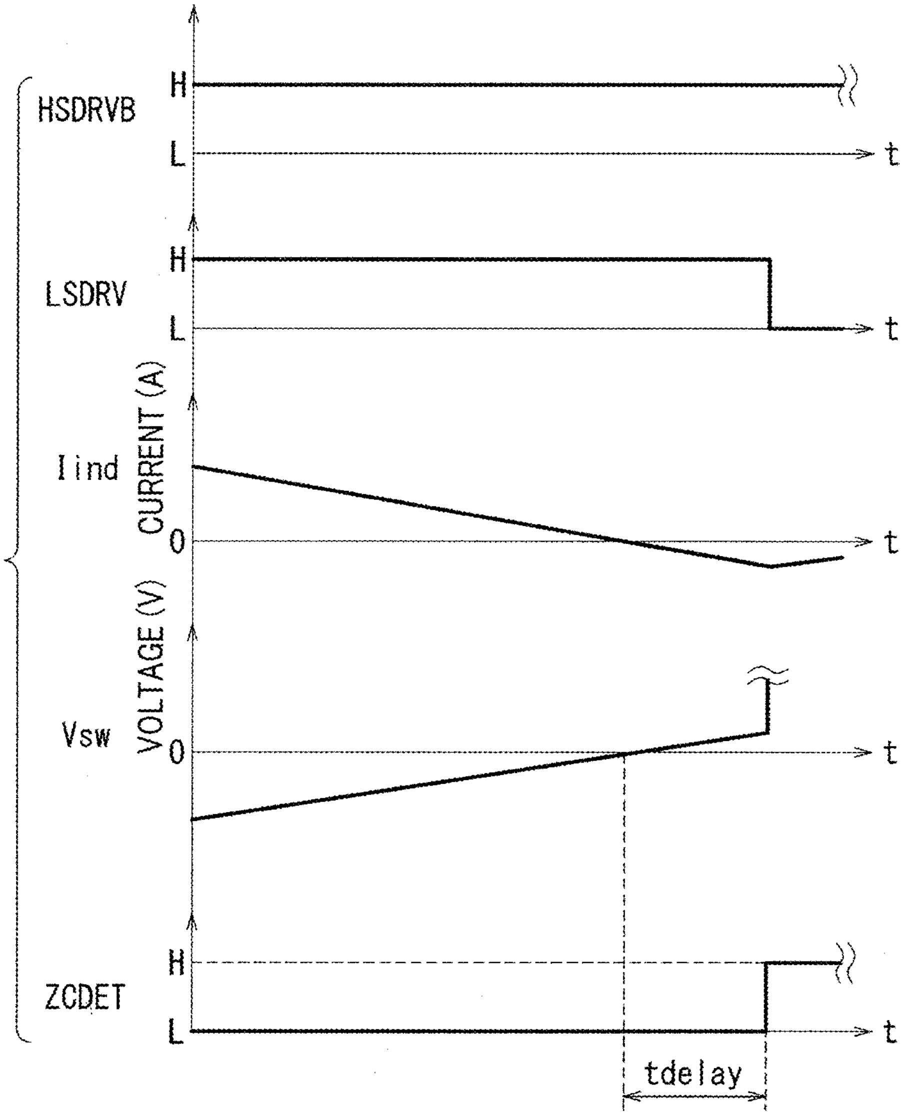
FIG. 3 is a timing chart of each signal illustrating an operation example of the switching regulator 1 of FIG. 1.

FIG. 2 is a block diagram illustrating a configuration of the zero-cross detector 11 of FIG. 1, and FIG. 3 is a timing chart of each signal illustrating an operation example of the switching regulator 1 of FIG. 1. In FIG. 2, the zero-cross detector 11 is configured to include a "current monitoring circuit" including a comparator 13.

Referring to FIG. 2, the switching voltage Vsw at the connection point between the drain of the MOS transistor Q1 and the drain of the MOS transistor Q2 is applied to the non-inverting input terminal of the comparator 13, and the ground voltage of the source of the MOS transistor Q2 is applied to the inverting input terminal of the comparator 13. The comparator 13 outputs the comparison result signal as the zero-cross detection signal ZCDET.

In the zero-cross detector 11 configured as described above, since the drain-source voltage Vds of the MOS transistor Q2 becomes zero V when the inductor current Iind becomes "zero A", "zero A" can be detected by comparing the voltages across the MOS transistor Q2. However, as illustrated in FIG. 3, there is such a problem that the reverse current Iind occurs due to the delay time tdelay.

Therefore, a current monitoring circuit 11A (included in the zero-cross detector 11) according to the following first modified embodiment has been proposed.

First Modified Embodiment

Figure 4:
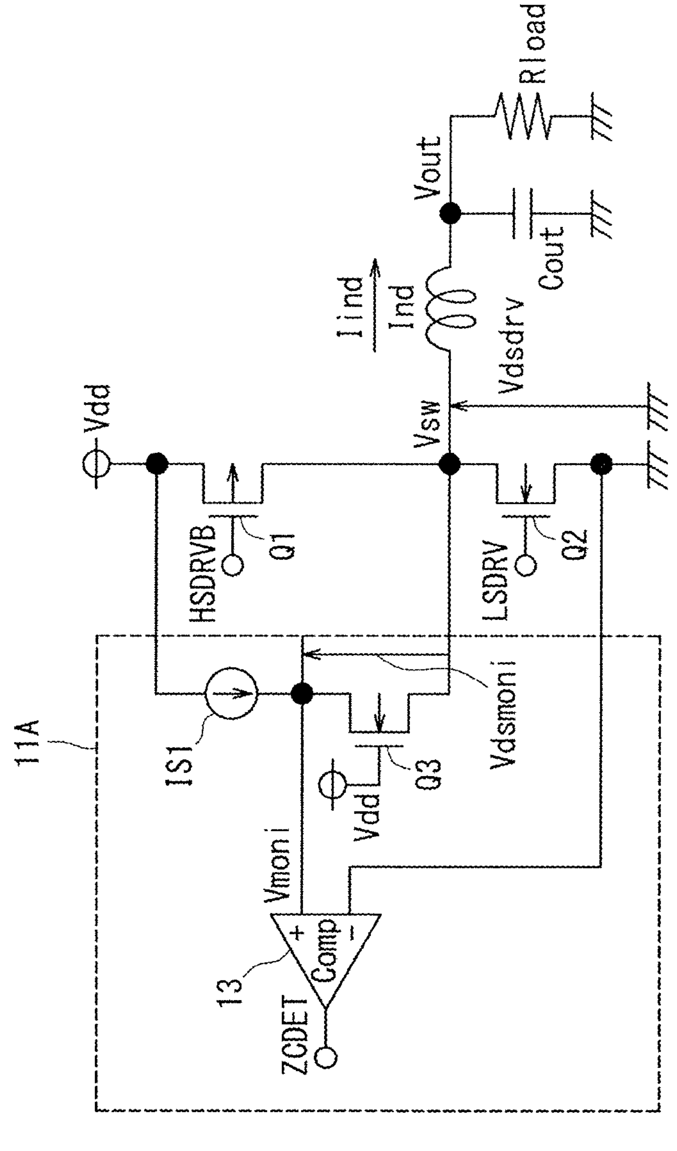
FIG. 4 is a block diagram illustrating a configuration of a current monitoring circuit 11A according to a first modified embodiment.
Figure 5:
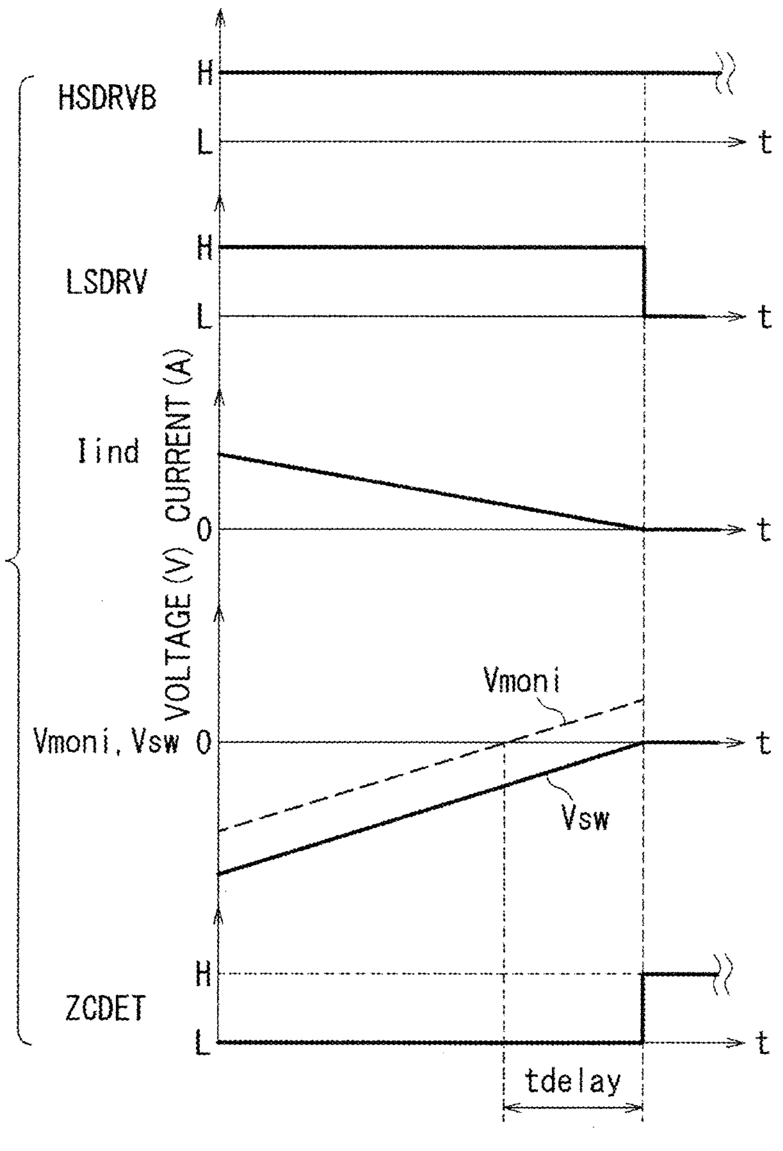
FIG. 5 is a timing chart of each signal illustrating an operation example of a switching regulator including the current monitoring circuit 11A of FIG. 4.

FIG. 4 is a block diagram illustrating a configuration of the current monitoring circuit 11A according to the first modified embodiment. FIG. 5 is a timing chart of each signal illustrating an operation example of a switching regulator including the current monitoring circuit 11A of FIG. 4. The current monitoring circuit 11A of FIG. 4 is different from the current monitoring circuit 11 of FIG. 2 in the following points:

(1) A constant current source IS1 is inserted between the power supply voltage Vdd and a non-inverting input terminal of a comparator 13.

(2) A MOS transistor Q3 having a gate to which the power supply voltage Vdd is applied is inserted between the non-inverting input terminal of the comparator 13 and the drain of the MOS transistor Q2.

According to the switching regulator including the current monitoring circuit 11A configured as described above, as illustrated in FIG. 5, the voltage Vmoni obtained by level-shifting the switching voltage Vsw by a predetermined voltage can be detected earlier by the delay time by comparing the voltage Vmoni with the ground voltage.

The detection voltage of the comparator 13 is expressed by the following equation:

$$0\ V < 0\ V - Vdsdrv + Vdsmoni,$$

where Vdsdrv is a voltage across the MOS transistor Q2, and Vdsmoni is a voltage across the MOS transistor Q3. The inductor current Iind, which is the DC detection current, is expressed by the following equation:

$$Iind = (\text{ON-resistance of } Q3) \times (\text{bias current by } IS1) / (\text{ON-resistance of } Q2).$$

The AC detection current in consideration of the delay time tdelay is expressed by the following equation.

$$\text{AC detection current} = \text{DC detection current} - Vout \times tDelay / Ind\ Vdsdrv = (\text{On-resistance of } Q2) \times (\text{Current } Iind \text{ of } Q2)\ Vdsmoni = (\text{On-resistance of } Q3) \times (\text{Bias current according to } IS1)$$

Next, a current monitoring circuit that detects a current other than the zero current will be described below.

Second Modified Embodiment

Figure 6:
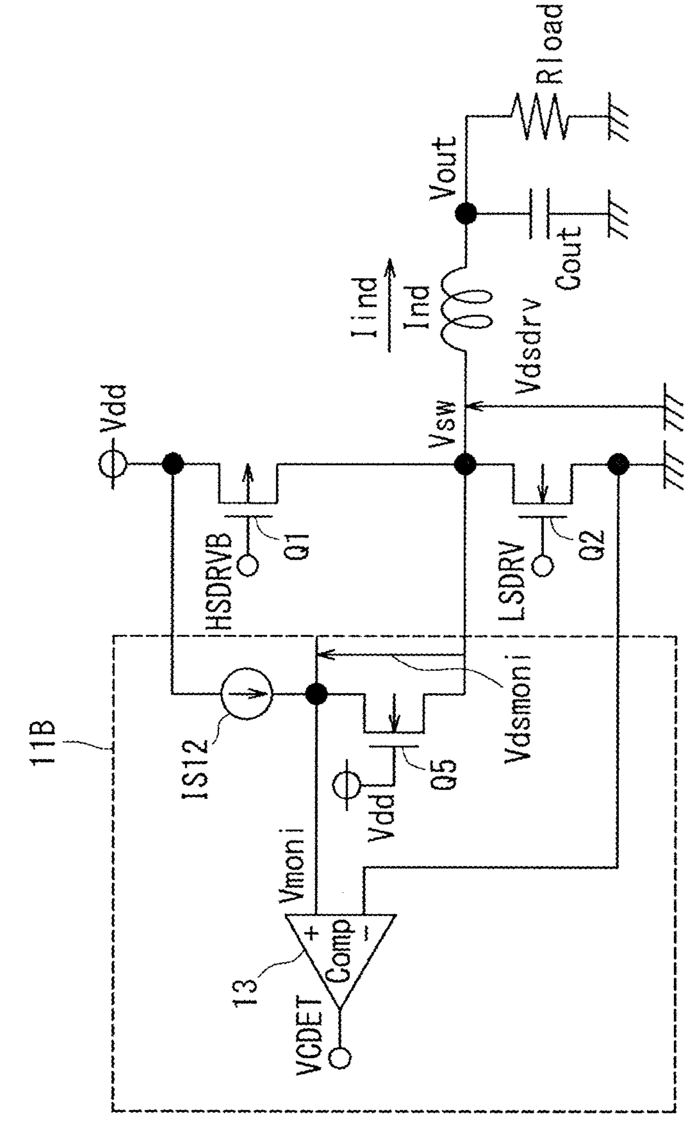
FIG. 6 is a block diagram illustrating a configuration of a current monitoring circuit 11B according to a second modified embodiment.
Figure 7:
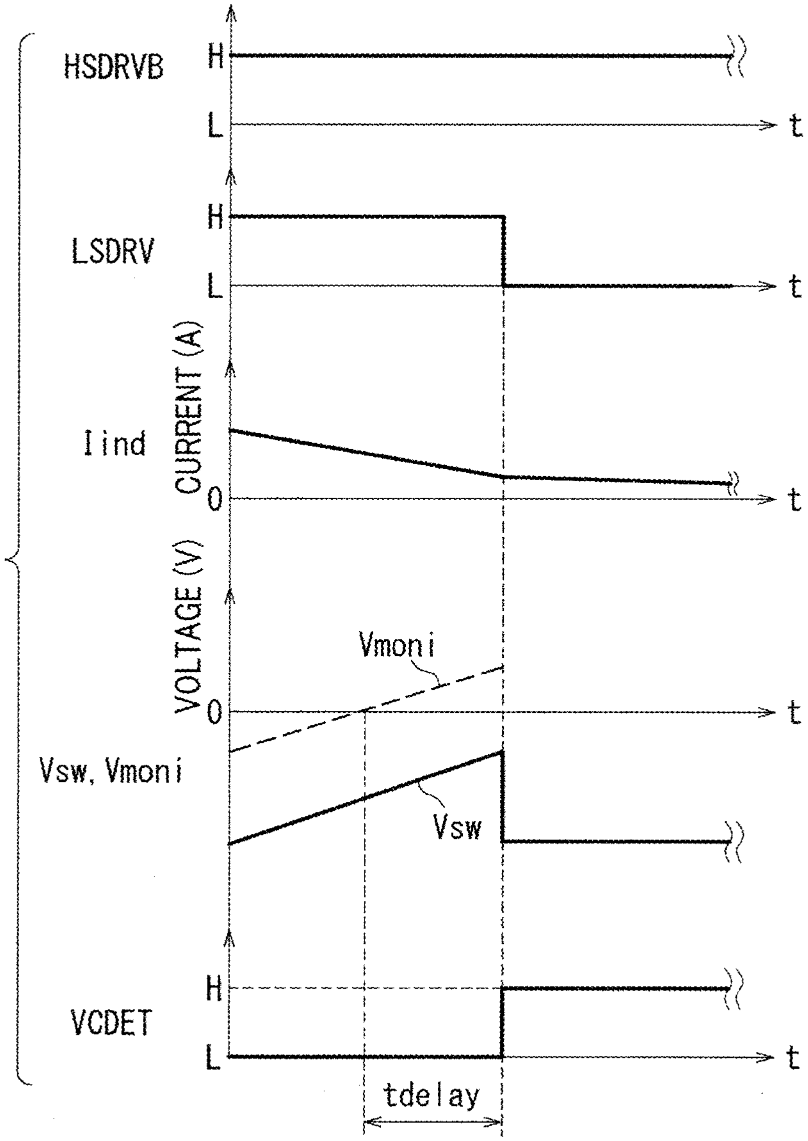
FIG. 7 is a timing chart of each signal illustrating an operation example of a switching regulator including the current monitoring circuit 11B of FIG. 6.

FIG. 6 is a block diagram illustrating a configuration of a current monitoring circuit 11B according to the second modified embodiment. FIG. 7 is a timing chart of each signal illustrating an operation example of a switching regulator including the current monitoring circuit 11B of FIG. 6. The current monitoring circuit 11B of FIG. 6 is different from the current monitoring circuit 11A of FIG. 4 in the following points.

(1) A constant current source IS12 is provided instead of the constant current source IS1, so that the voltage Vdsmoni is made to be larger than that at the time of zero detection of FIG. 4, so that the comparator 13 detects a current value larger than "zero A".

(2) The comparator 13 outputs the voltage VCDET of the comparison result signal.

Third Modified Embodiment

Figure 8:
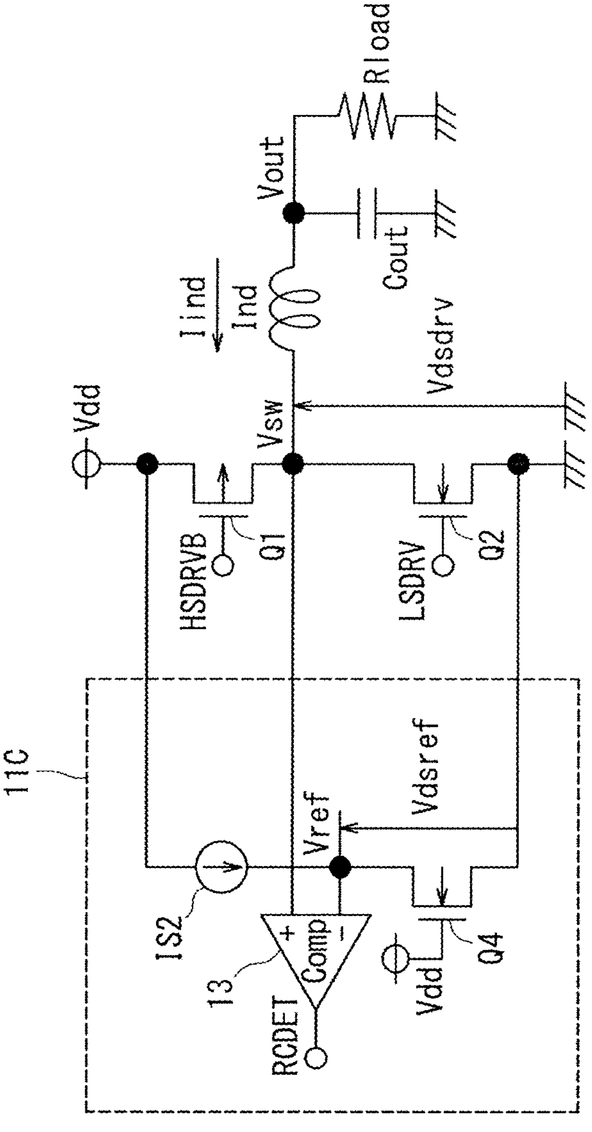
FIG. 8 is a block diagram illustrating a configuration of a current monitoring circuit 11C according to a third modified embodiment.
Figure 9:
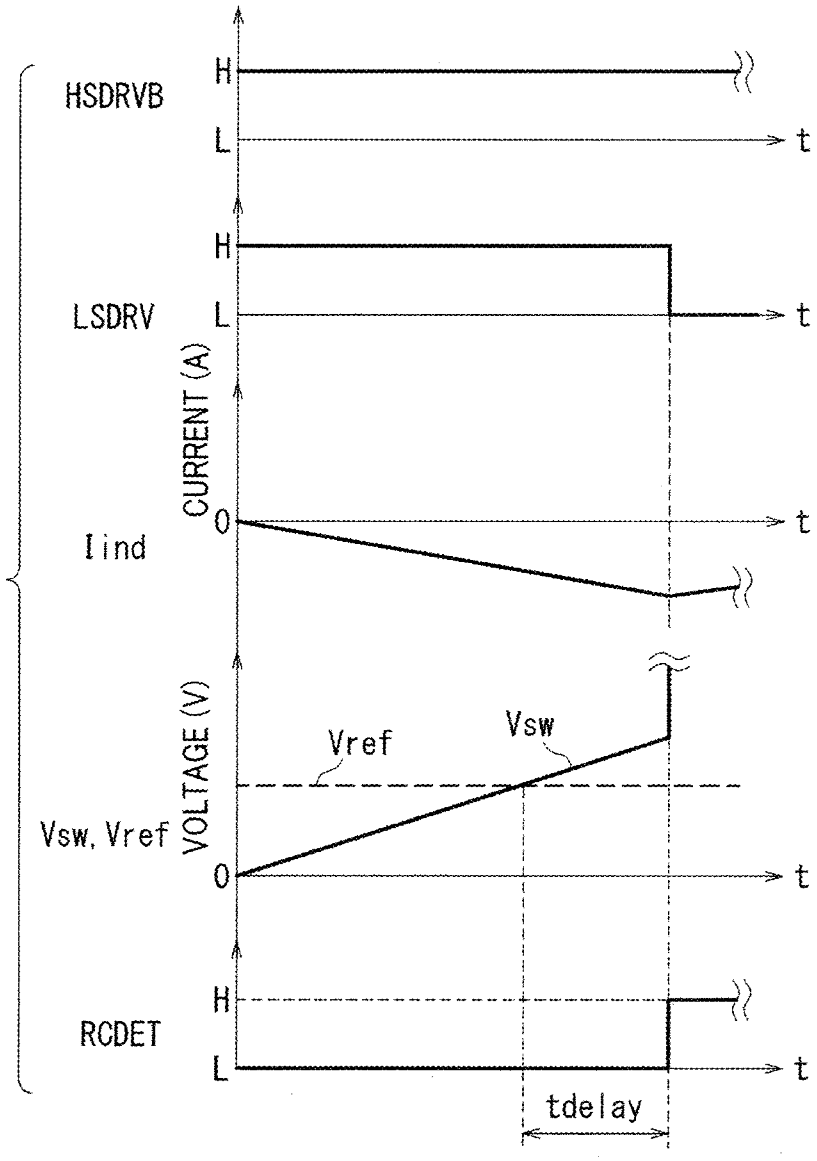
FIG. 9 is a timing chart of each signal illustrating an operation example of a switching regulator including the current monitoring circuit 11C of FIG. 8.

FIG. 8 is a block diagram illustrating a configuration of a current monitoring circuit 11C according to the third modified embodiment. FIG. 9 is a timing chart of each signal illustrating an operation example of a switching regulator including the current monitoring circuit 11C of FIG. 8. The current monitoring circuit 11C of FIG. 8 is different from the current monitoring circuit 11B of FIG. 6 in the following points:

(1) A constant current source IS2 is provided instead of the constant current source IS1A. In this case, the power supply voltage Vdd is connected to the inverting input terminal of the comparator 13 via the constant current source IS2.

(2) The switching voltage Vsw is applied to the non-inverting input terminal of the comparator 13.

(3) A MOS transistor Q4 having a gate to which the power supply voltage Vdd is applied is inserted between the inverting input terminal (reference voltage Vref) of the comparator 13 and the ground voltage.

In the current monitoring circuit 11C configured as described above, the comparator 13 detects the current flowing backward by the amount corresponding to the voltage Vdsref.

Fourth Modified Embodiment

Figure 10:
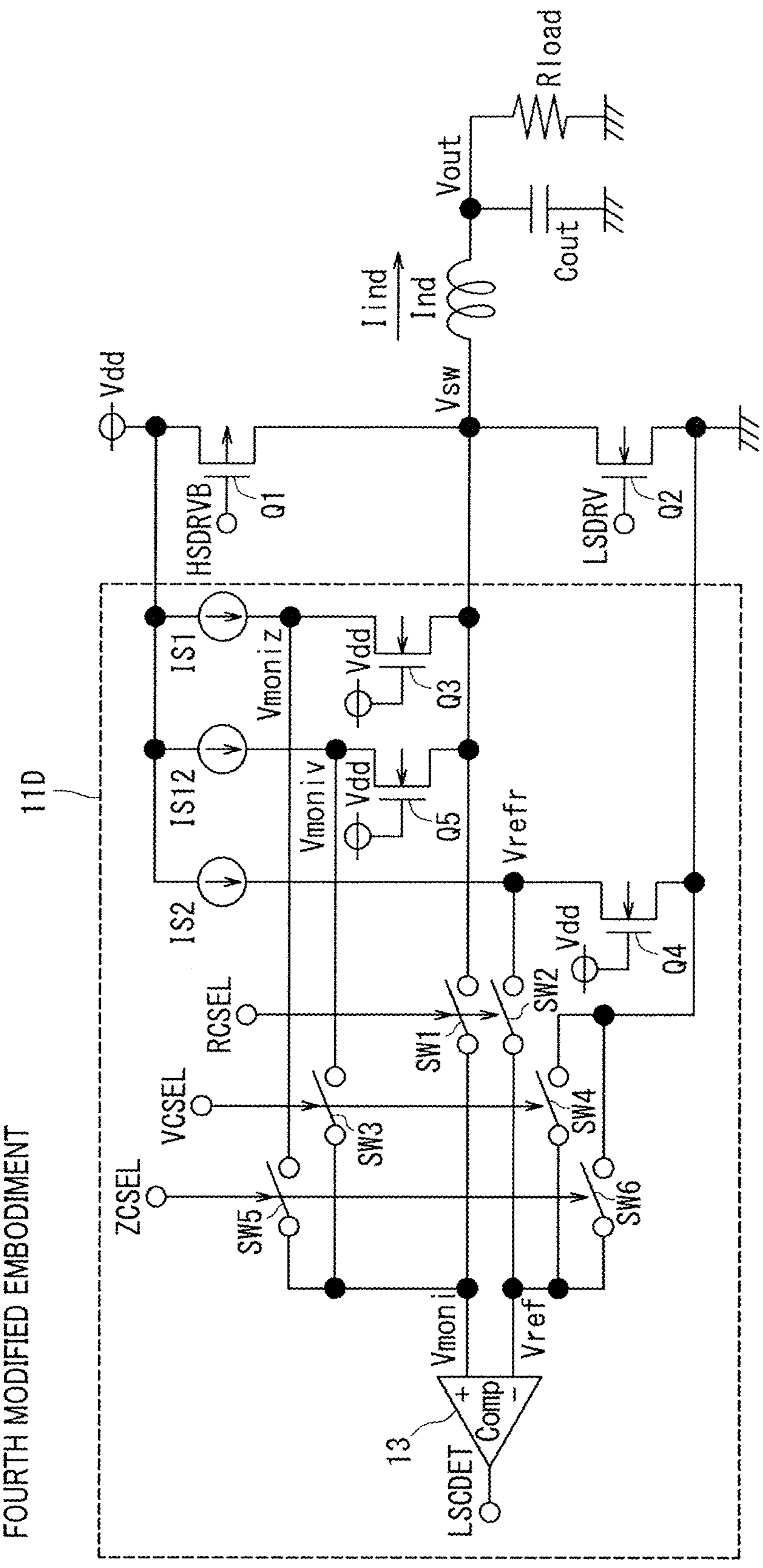
FIG. 10 is a block diagram illustrating a configuration of a current monitoring circuit 11D according to a fourth modified embodiment.
Figure 11:
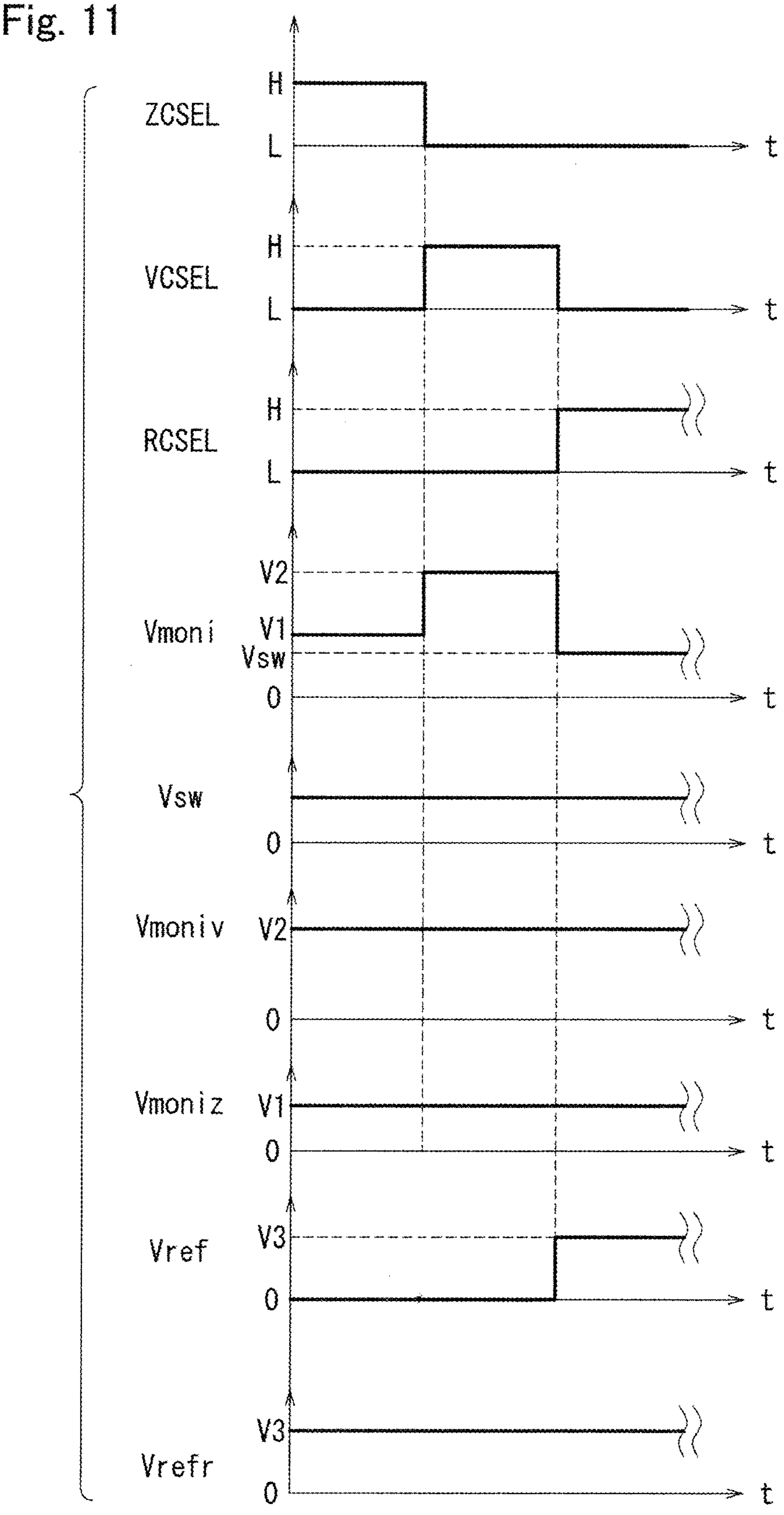
FIG. 11 is a timing chart of each signal illustrating an operation example of a switching regulator including the current monitoring circuit 11D of FIG. 10.

FIG. 10 is a block diagram illustrating a configuration of a current monitoring circuit 11D according to the fourth modified embodiment. FIG. 11 is a timing chart of each signal illustrating an operation example of the switching regulator including the current monitoring circuit 11D of FIG. 10.

Referring to FIG. 10, the current monitoring circuit 11D is configured to include three constant current sources IS1, IS2, and IS12, the MOS transistors Q3 to Q5, switches SW1 to SW6, and the comparator 13. In this case, the switches SW1 and SW2 are turned on or off based on the selection signal RCSEL, the switches SW3 and SW4 are turned on or off based on the selection signal VCSEL, the switches SW5 and SW6 are turned on or off based on the selection signal ZCSEL, and any switch pair is turned on. The comparator 13 outputs the voltage LSCDET of the comparison result signal.

The current monitoring circuit 11D configured as described above is a circuit example in a case where three types of inductor currents are detected by one comparator 13.

Comparison Example

Figure 12:
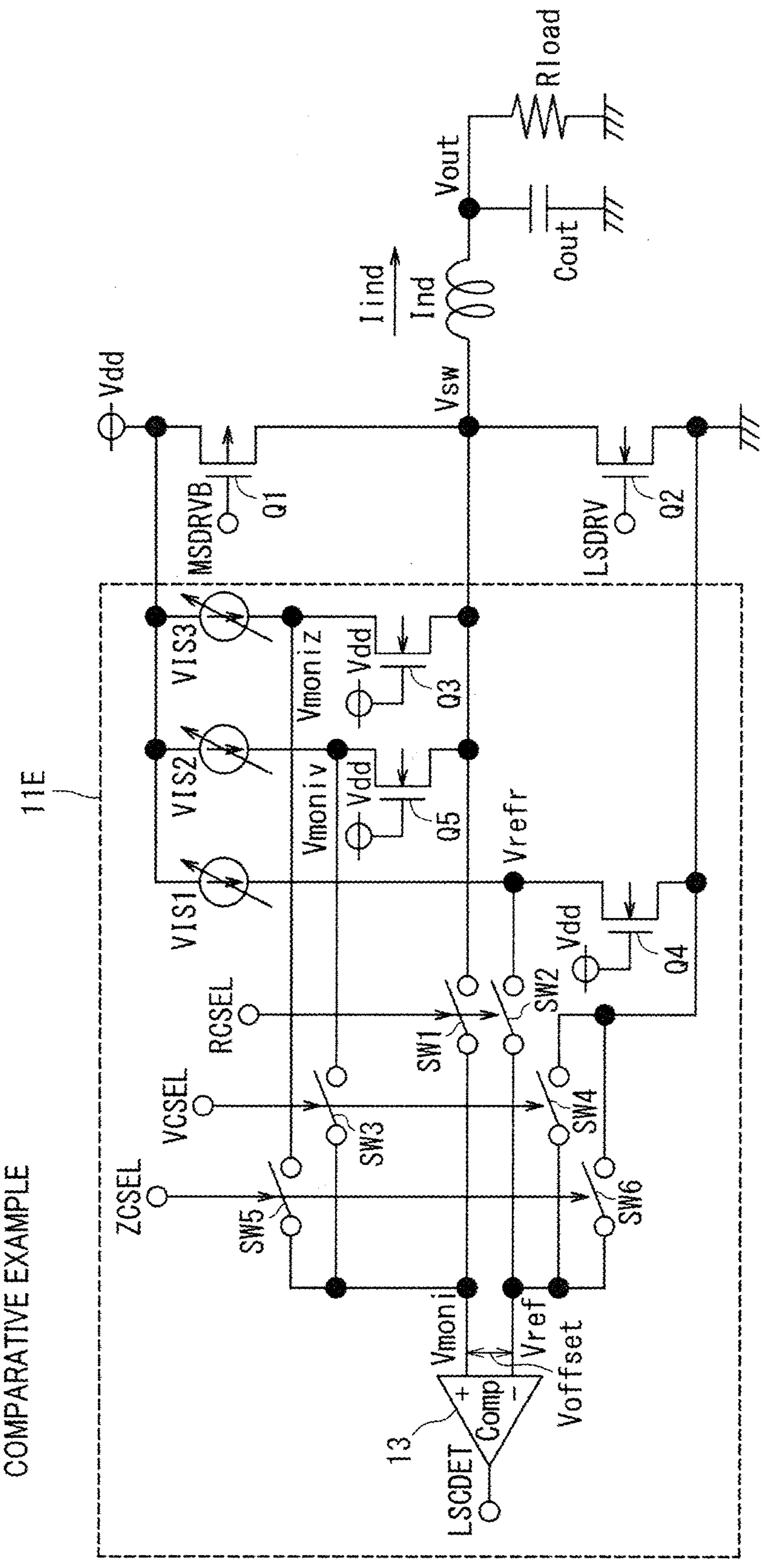
FIG. 12 is a block diagram illustrating a configuration of a current monitoring circuit 11E according to a comparative example.

FIG. 12 is a block diagram illustrating a configuration of a current monitoring circuit 11E according to a comparative example disclosed in Patent Document 1.

Referring to FIG. 12, the current monitoring circuit 11E is configured to include three variable constant current sources VIS1 to VIS3, the MOS transistors Q3 to Q5, the switches SW1 to SW6, and the comparator 13. In this case, the switches SW1 and SW2 are turned on or off based on a selection signal RCSEL, the switches SW3 and SW4 are turned on or off based on a selection signal VCSEL, the switches SW5 and SW6 are turned on or off based on a selection signal ZCSEL, and any switch pair is turned on. The comparator 13 outputs the voltage LSCDET of the comparison result signal.

The first to third problems of the current monitoring circuit 11E configured as described above will be described below.

First Problem

In a case where it is desired to monitor zero of the inductor current Iind and a plurality of detection values such as a positive direction overcurrent and a reverse direction overcurrent, even if the input conversion offset voltage Voffset of the shared comparator 13 is the same as each other since the reference voltage Vrefr and the monitoring voltages Vmoniz and Vmoniv vary, it is necessary to perform correction such as trimming for adjusting the voltages generated in the MOS transistors Q3 to Q5 individually, and the number of correction items at the time of mass production and the chip area by the correction circuit increase (FIG. 12).

Figure 13:
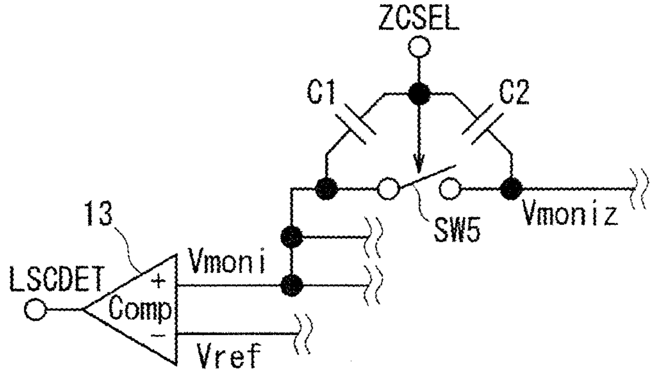
FIG. 13 is a block diagram illustrating a partial configuration of the current monitoring circuit 11E of FIG. 12.
Figure 14:
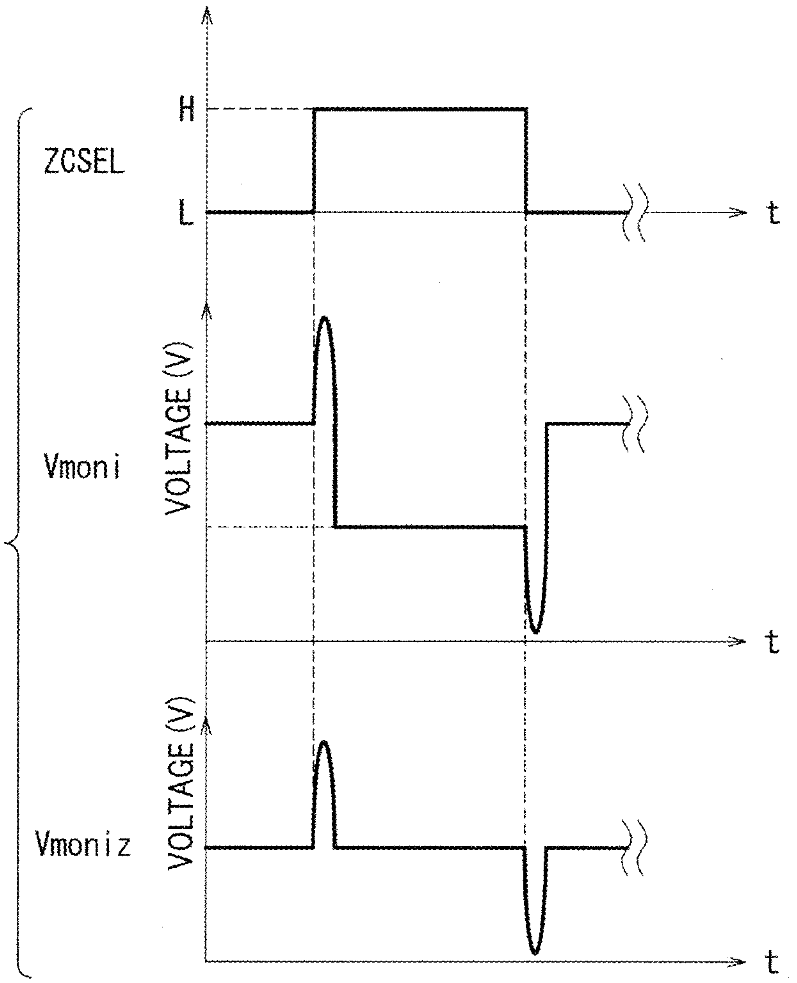
FIG. 14 is a timing chart of each signal illustrating an operation example of a switching regulator including the current monitoring circuit 11E of FIG. 13.

FIG. 13 is a block diagram illustrating a partial configuration of the current monitoring circuit 11E of FIG. 12. FIG. 14 is a timing chart of each signal illustrating an operation example of a switching regulator including the current monitoring circuit of FIG. 13.

Second Problem

Since both the reference voltage and the monitoring voltage have finite impedance, there is such a concern that noise via the parasitic capacitances C1 and C2 is superimposed on the differential input and the generated voltage of the comparator 13 and erroneously detected when the switching-over switches SW1 to SW6 are opened and closed (FIGS. 13 and 14).

Figure 15:
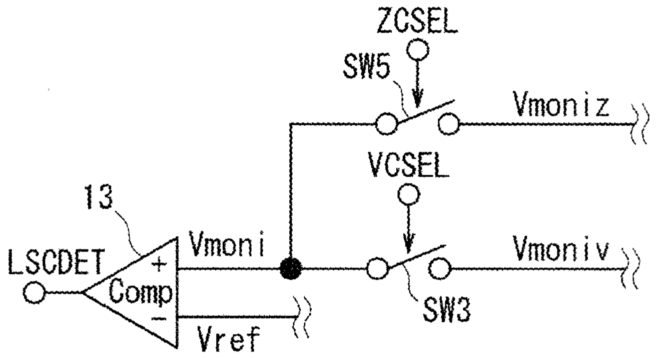
FIG. 15 is a block diagram illustrating a partial configuration of the current monitoring circuit 11E of FIG. 12.
Figure 16:
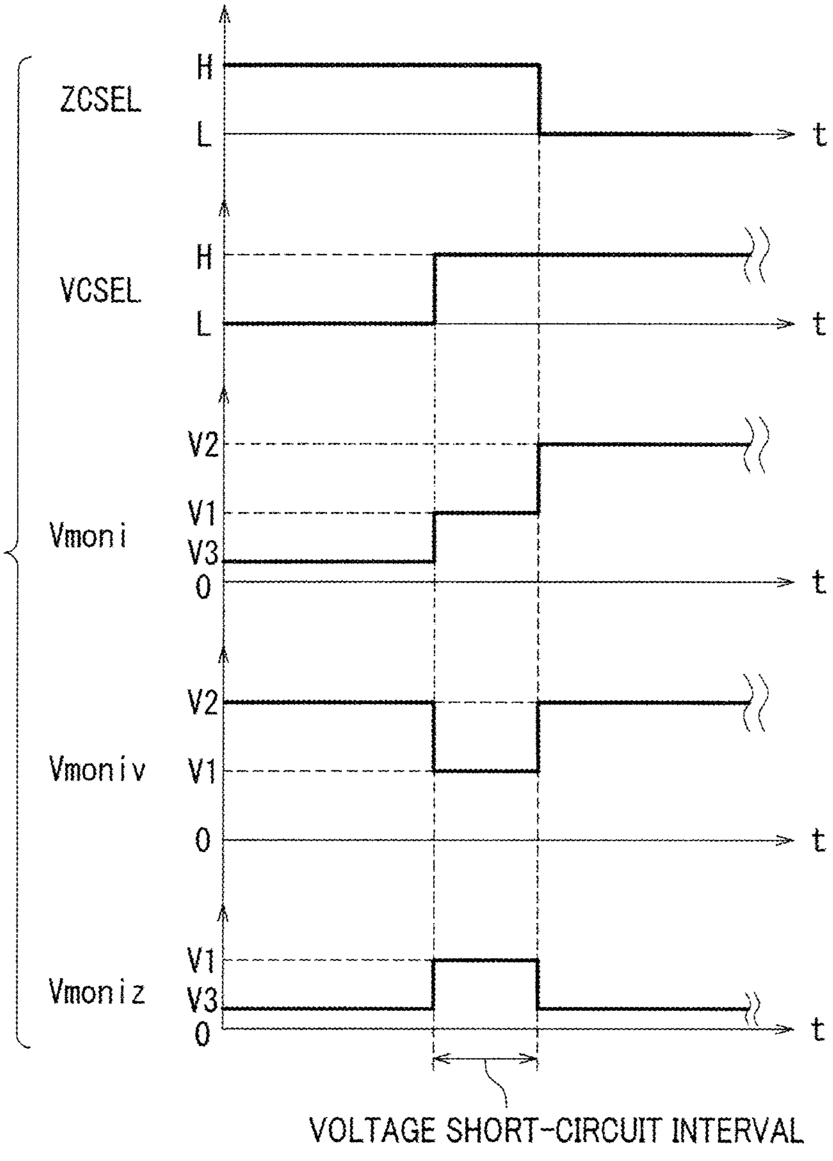
FIG. 16 is a timing chart of each signal illustrating an operation example of a switching regulator including the current monitoring circuit 11E of FIG. 15.

FIG. 15 is a block diagram illustrating a configuration of the current monitoring circuit 11E of FIG. 12. FIG. 16 is a timing chart of each signal illustrating an operation example of a switching regulator including the current monitoring circuit of FIG. 15.

Third Problem

When the switching-over switches SW1 to SW6 are opened and closed, if a state in which the switching-over switches SW1 to SW6 are simultaneously turned on occurs due to a timing difference between control signals of the switches SW1 to SW6, there is such a concern that a reference voltage or a monitoring voltage is mixed and erroneously detected (FIGS. 15 and 16).

Embodiments for solving the above problems 1 to 3 will be described below.

First Embodiment

Figure 17:
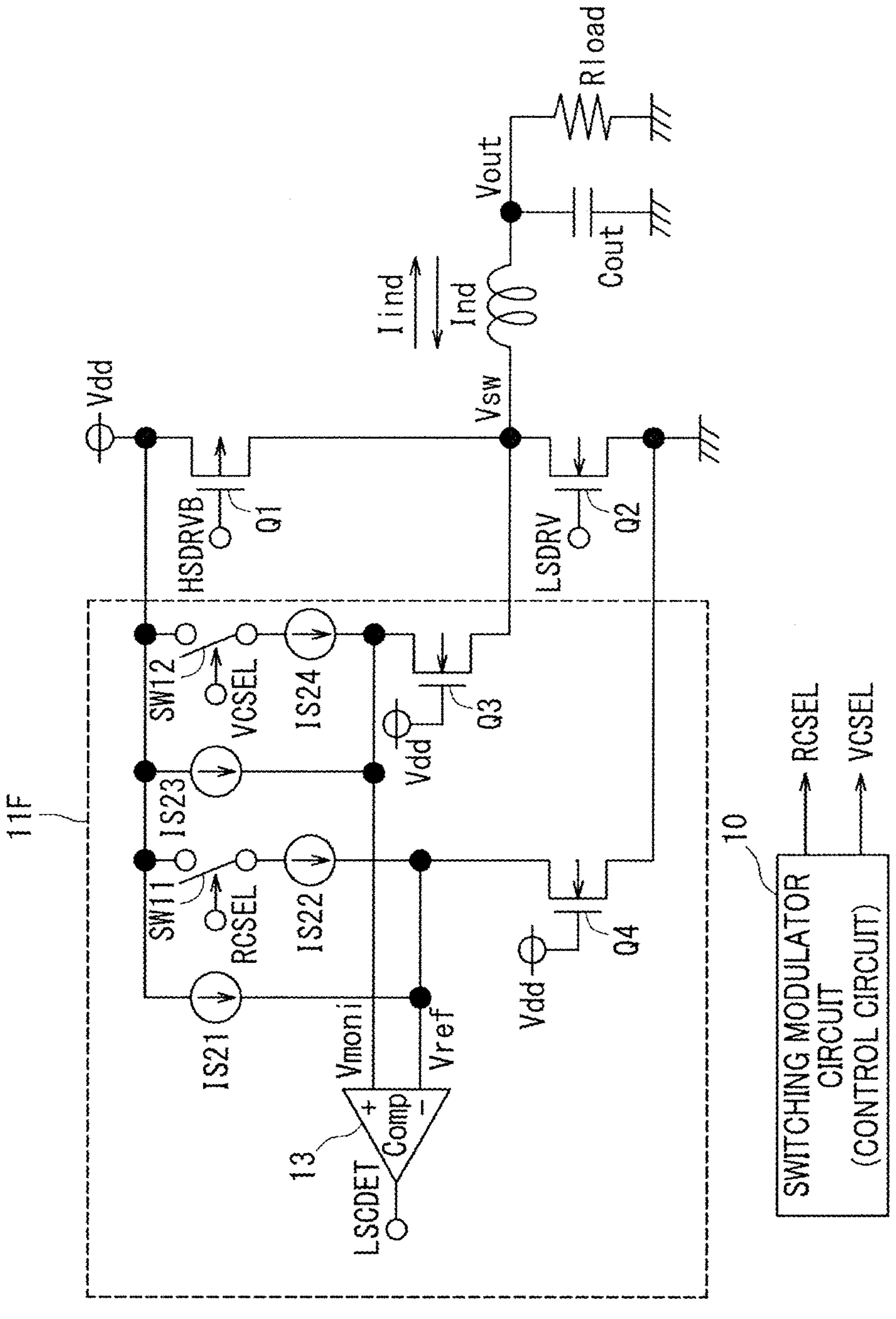
FIG. 17 is a block diagram illustrating a configuration example of a switching regulator including a current monitoring circuit 11F according to a first embodiment.

FIG. 17 is a block diagram illustrating a configuration example of a switching regulator including a current monitoring circuit 11F according to a first embodiment.

Referring to FIG. 17, the current monitoring circuit 11F is configured to include four constant current sources IS21 to IS24, switches SW11 and SW12, the MOS transistors Q3 and Q4, and the comparator 13. The switching regulator including the current monitoring circuit 11F includes a switching modulator circuit 10 that is a control circuit.

The power supply voltage Vdd is connected to the inverting input terminal of the comparator 13 via the constant current source IS21, and is also connected to the inverting input terminal of the comparator 13 via the switch SW11, which is controlled to be turned on and off by the selection signal RCSEL, and the constant current source IS22. In addition, the power supply voltage Vdd is connected to the non-inverting input terminal of the comparator 13 via the constant current source IS23, and is connected to the non-inverting input terminal of the comparator 13 via the switch SW12, which is controlled to be turned on and off by the selection signal VCSEL, and the constant current source IS24. In this case, the MOS transistor Q3 having the gate to which the power supply voltage Vdd is applied is inserted between the non-inverting input terminal of the comparator 13 and the switching voltage Vsw. Furthermore, the MOS transistor Q4 having the gate to which the power supply voltage Vdd is applied is inserted between the inverting input terminal of the comparator 13 and the ground voltage.

The non-inverting input terminal of the comparator 13 is a generation point of the monitoring voltage Vmoni and becomes the monitoring voltage Vmoni, the inverting input terminal thereof is a generation point of the reference voltage Vref and becomes the reference voltage Vref, and the comparator 13 compares these voltages and outputs the voltage LSCDET of the comparison result signal. That is, the constant current sources IS21 and IS22 and the switch SW11 configure a reference voltage circuit for generating the reference voltage Vref, and the constant current sources IS23 and IS24 and the switch SW12 configure a monitoring circuit for generating the monitoring voltage Vmoni for monitoring the switching voltage Vsw.

Referring to FIG. 17, the switching modulator circuit 10 generates, for example, a PWM signal for switching the MOS transistors Q1 and Q2 configuring the inverter circuit based on the output voltage Vout fed back to the terminal T4 so that the output voltage Vout becomes a predetermined value, and switches the MOS transistors Q1 and Q2. In addition, the switching modulator circuit 10 generates the selection signals RCSEL and VCSEL at different timings as described above and outputs the selection signals RCSEL and VCSEL to the control terminals of the switches SW11 and SW12, respectively, to control turning on or off of the switches SW11 and SW12.

According to the current monitoring circuit 11F of FIG. 17 configured as described above, instead of separately generating and switching the reference voltage Vref and the monitoring voltage Vmoni, the voltages generated in the MOS transistor Q3 and the MOS transistor Q4 are changed at the timings different from each other, so that the reference voltage Vref or the monitoring voltage Vmoni is changed, resulting in that the three problems 1 to 3 of the comparative example of FIG. 12 can be solved. Further, by commonizing the reference voltage circuit and the monitoring circuit, the chip area can be reduced and circuit current consumption can be reduced.

Solution to First Problem

For the first problem of the comparative example, the MOS transistor Q4 generating the reference voltage Vref and the bias current (made by IS21 and IS22) thereof, and the MOS transistor Q3 generating the monitoring voltage and the bias current (by IS23 and IS24) thereof are also used to correct any one of the three types of detection currents, so that the other detection values are also corrected.

In the current monitoring circuit 11E of FIG. 12, when the ON-resistance of the MOS transistor Q5 is finished to be smaller than the design value and the ON-resistance of the MOS transistor Q3 is finished to be larger than the design value, it is necessary to correct the monitoring voltage Vmoniz and the monitoring voltage Vmoniv in opposite directions. On the other hand, in the current monitoring circuit 11F of FIG. 17, since the circuit is shared as described above and the finish variation is the same, the correction can be completed only by trimming the input conversion offset, the ON-resistance, the bias current, and the like of the comparator 13 once. Accordingly, the above-described first problem can be solved.

Solution to Second Problem

The direct parasitic capacitances of the switches SW11 and SW12 are not visible at the node of the reference voltage Vref and the node of the monitoring voltage Vmoni, so that the above-described second problem can be solved.

Solution to Third Problem

Since the switches SW11 and SW12 can be turned on by one switch in each case both at the time of zero and a positive overcurrent (switch SW12 is turned on by selection signal VCSEL, and switch SW11 is turned off) and at the time of zero and a reverse overcurrent (switch SW11 is turned on by selection signal RCSEL, and switch SW12 is turned off), it is not necessary to adjust the control timing. Accordingly, the above-described third problem can be solved.

As described above, according to the first embodiment, since not only the comparator 13 but also the monitoring circuit and the reference voltage circuit are shared, it is possible to collectively correct manufacturing variations of a plurality of detection circuits. In addition, there is no need to adjust the control timing, and since the direct parasitic capacitance cannot be seen at the input terminal of the comparator 13, erroneous detection can be avoided.

Second Embodiment

Figure 18:
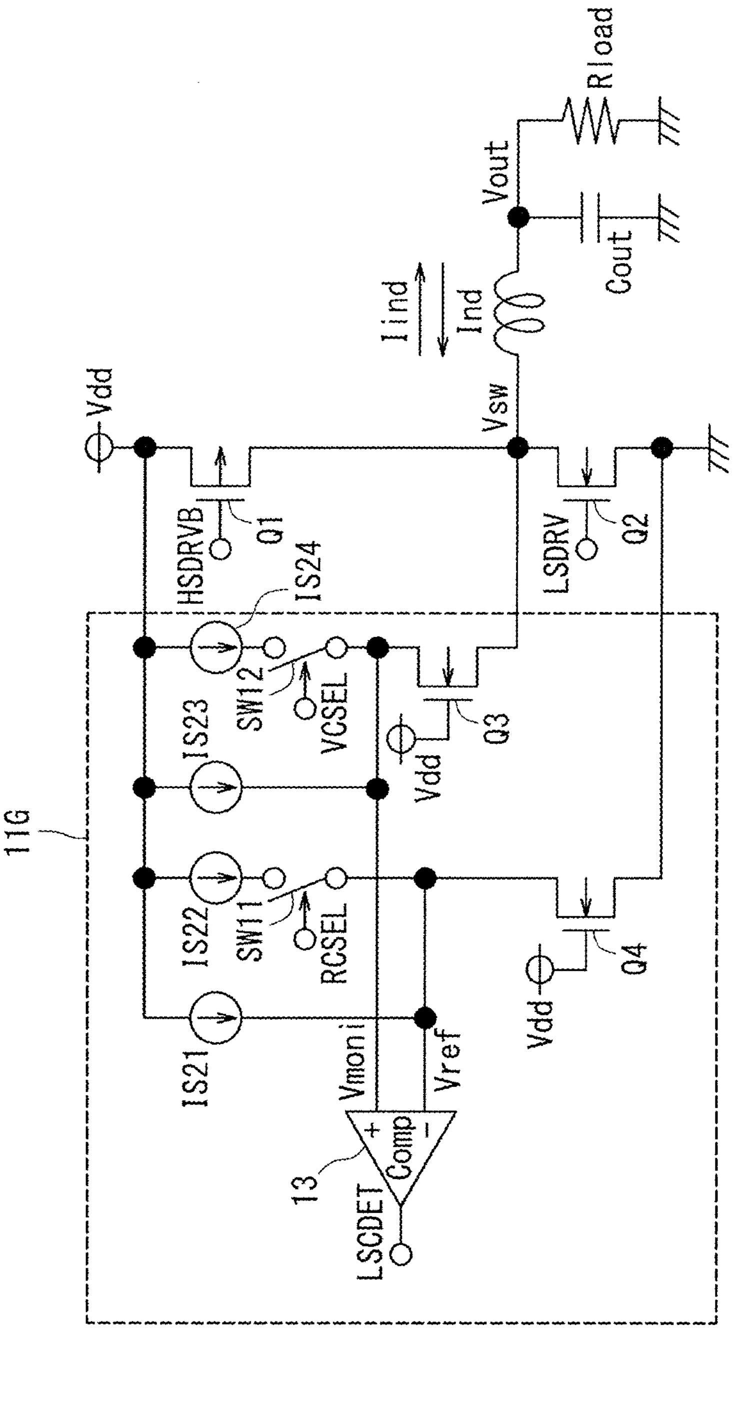
FIG. 18 is a block diagram illustrating a configuration example of a switching regulator including a current monitoring circuit 11G according to a second embodiment.

FIG. 18 is a block diagram illustrating a configuration example of a switching regulator including a current monitoring circuit 11G according to a second embodiment. The current monitoring circuit 11G of FIG. 18 is different from the current monitoring circuit 11F of FIG. 17 in the following points.

(1) A constant current source IS22 is inserted between the switch SW11 and the inverting input terminal of the comparator 13.

(2) A constant current source IS24 is inserted between the switch SW11 and the inverting input terminal of the comparator 13.

Differences will be described below.

There are a plurality of embodiments of the generation method or technology of the reference voltage Vref or the monitoring voltage Vmoni, and the second embodiment of FIG. 18 is an example thereof. This is an example in which the switches SW11 and SW12 are arranged on the downstream side of the currents of the constant current sources IS22 and IS24 when the impedance of the reference voltage Vref or the monitoring voltage Vmoni is low or the parasitic capacitances of the switches S11 and SW12 are small.

According to the second embodiment configured as described above, in addition to the above-described functions and effects, the same functions and effects as those of the first embodiment are obtained.

Third Embodiment

Figure 19:
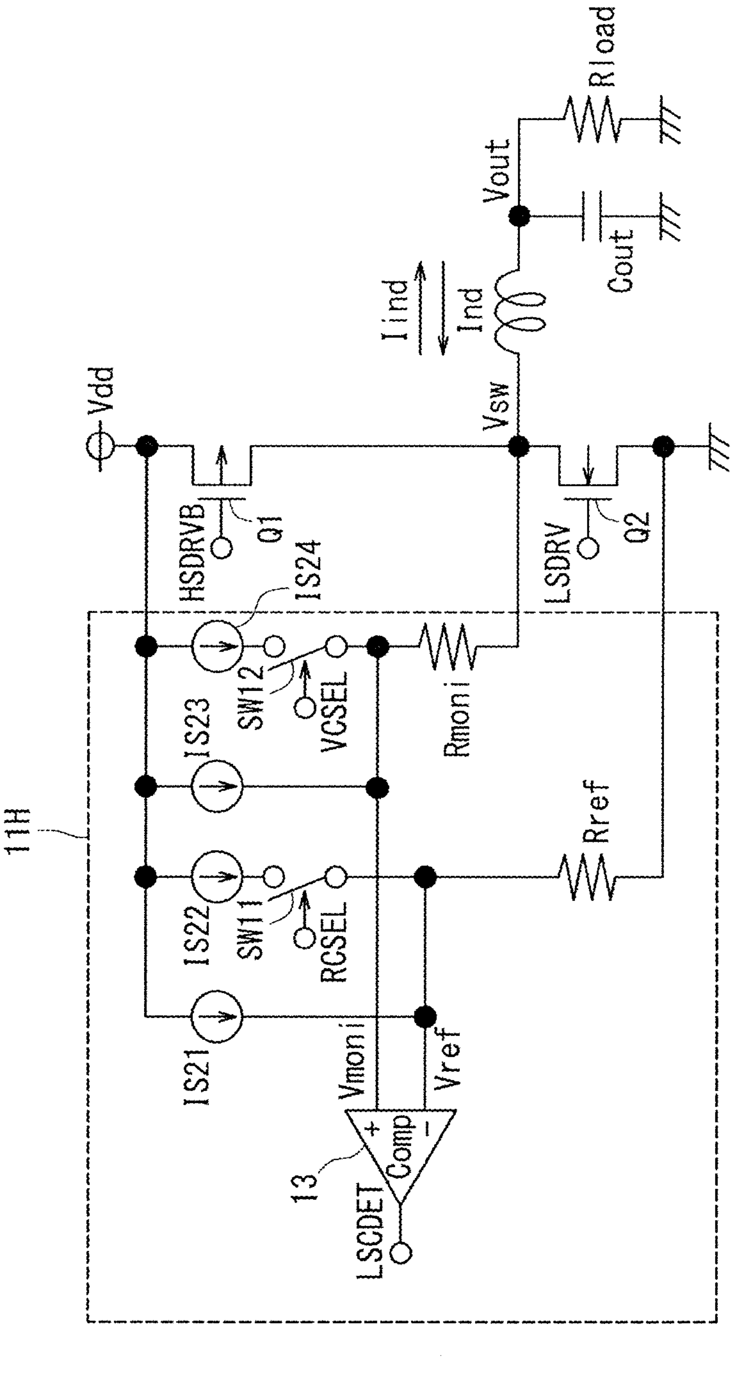
FIG. 19 is a block diagram illustrating a configuration example of a switching regulator including a current monitoring circuit 11H according to a third embodiment.

FIG. 19 is a block diagram illustrating a configuration example of a switching regulator including a current monitoring circuit 11H according to a third embodiment. The current monitoring circuit 11H of FIG. 19 is different from the current monitoring circuit 11F of FIG. 17 in the following points.

(1) The resistor Rmoni is provided instead of the MOS transistor Q3.

(2) The resistor Rref is provided instead of the MOS transistor Q4.

Differences will be described below.

The current monitoring circuit 11H of FIG. 19 is an example in which the reference voltage Vref or the monitoring voltage Vmoni is generated not by the MOS transistors Q3 and Q4 but by the resistors Rmoni and Rref. As a result, the reference voltage Vref or the monitoring voltage Vmoni is changed not by the ON-resistance of the MOS transistor but by the resistance value.

According to the third embodiment configured as described above, the same functions and effects as those of the first embodiment are obtained.

Fourth Embodiment

Figure 20:
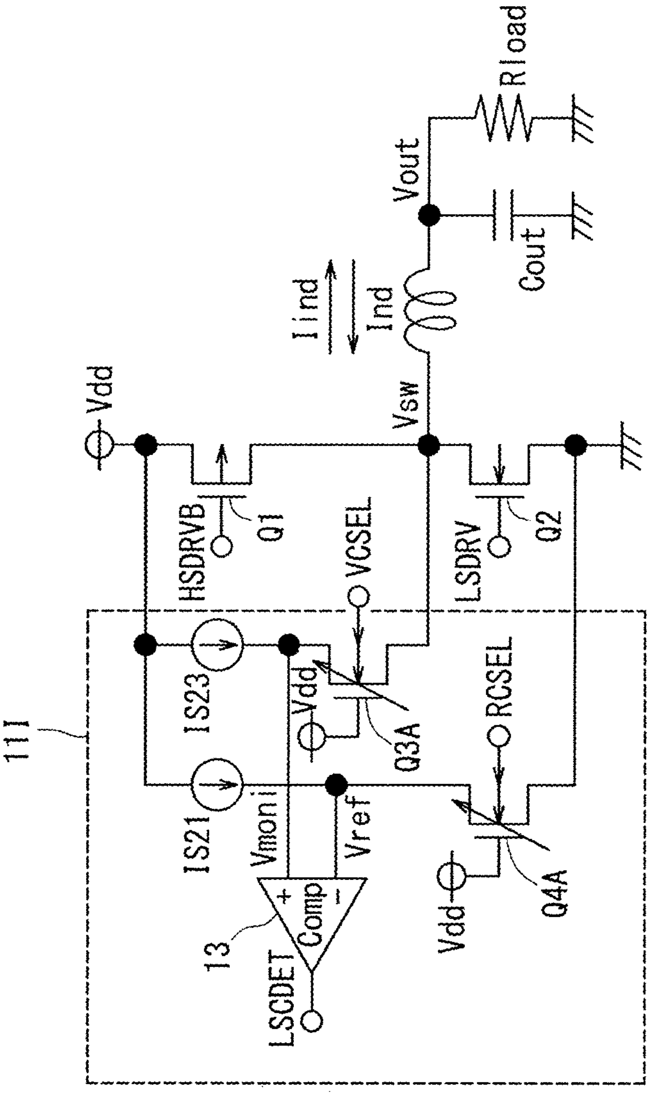
FIG. 20 is a block diagram illustrating a configuration example of a switching regulator including a current monitoring circuit 11I according to a fourth embodiment.

FIG. 20 is a block diagram illustrating a configuration example of a switching regulator including a current monitoring circuit 11I according to a fourth embodiment. The current monitoring circuit 11I of FIG. 20 is different from the current monitoring circuit 11F of FIG. 17 in the following points.

(1) Instead of the switch SW12, the constant current source IS24, and the MOS transistor Q3, a MOS transistor Q3A is provided.

(2) Instead of the switch SW11, the constant current source IS22, and the MOS transistor Q4, a MOS transistor Q4A is provided.

Differences will be described below.

Referring to FIG. 20, each of the MOS transistors Q3A and Q4A includes, for example, a circuit in which a plurality of MOS transistors are connected in series, and some of the MOS transistors are short-circuited based on the selection signals VCSEL and RCSEL to change the substantial transistor size. Thus, the resistance value between the source and the drain of each of the MOS transistors Q3A and Q4A is changed to change the current flowing therethrough. With this, the monitoring voltage Vmoni and the reference voltage Vref are changed. It is to be noted that, instead of the MOS transistors Q3A and Q4A including a plurality of MOS transistors in series, for example, the circuit in which a plurality of resistors are connected in series may be used.

According to the fourth embodiment configured as described above, in addition to the above-described functions and effects, the same functions and effects as those of the first embodiment are obtained.

Fifth Embodiment

Figure 21:
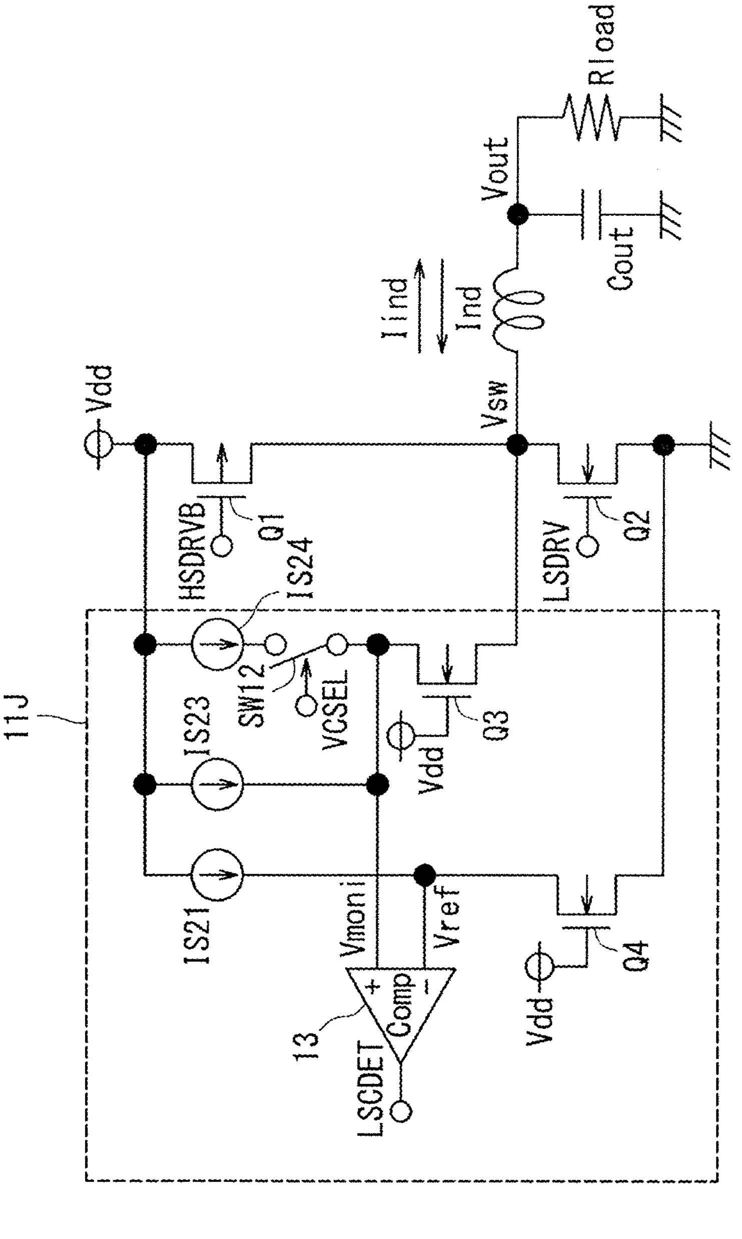
FIG. 21 is a block diagram illustrating a configuration example of a switching regulator including a current monitoring circuit 11J according to a fifth embodiment.

FIG. 21 is a block diagram illustrating a configuration example of a switching regulator including a current monitoring circuit 11J according to a fifth embodiment. The current monitoring circuit 11J of FIG. 21 is different from the current monitoring circuit 11F of FIG. 17 in the following points.

(1) The switch SW11 and the constant current source IS22 are removed.

Differences will be described below.

In the current monitoring circuit 11J of FIG. 21 configured as described above, the current for generating the monitoring voltage Vmoni may be switched with the binary value between the predetermined current value I11 and the predetermined current value I12, so that the monitoring voltage Vmoni may be switched with the binary value of the predetermined voltage value V11 and the predetermined voltage value V12.

According to the fifth embodiment configured as described above, in addition to the above-described functions and effects, the same functions and effects as those of the first embodiment are obtained.

Sixth Embodiment

Figure 22:
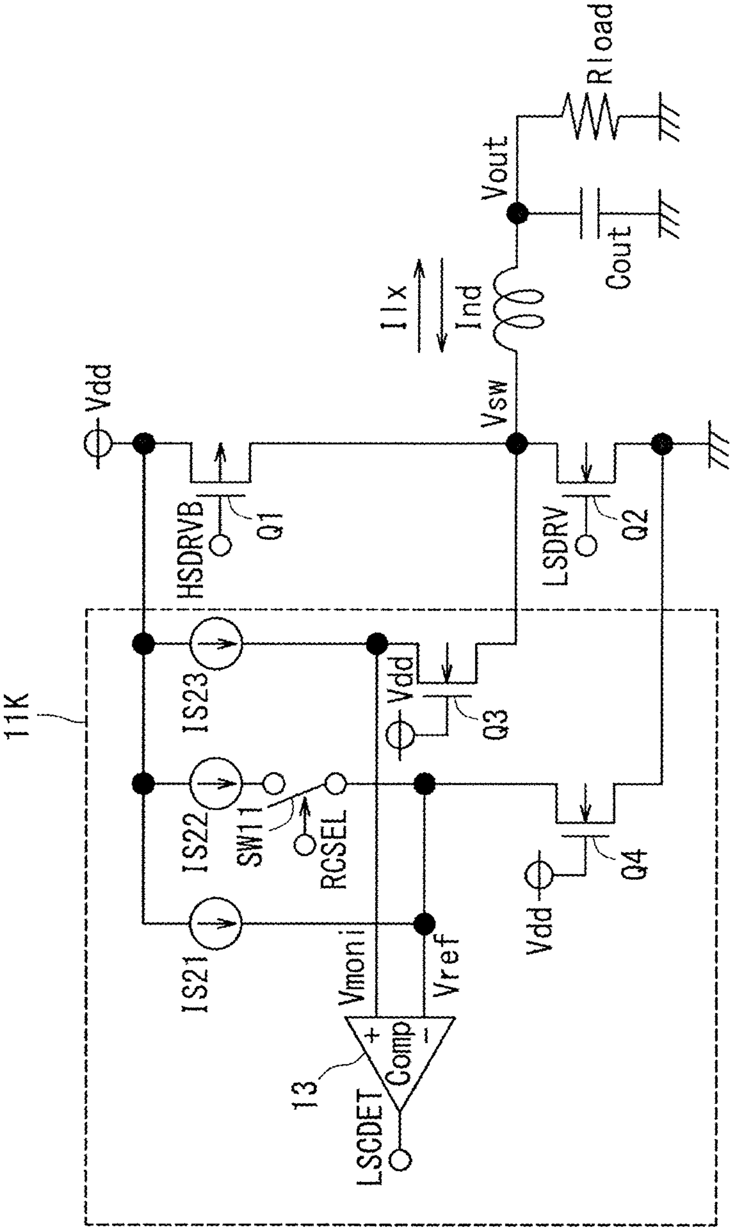
FIG. 22 is a block diagram illustrating a configuration example of a switching regulator including a current monitoring circuit 11K according to a sixth embodiment.

FIG. 22 is a block diagram illustrating a configuration example of a switching regulator including a current monitoring circuit 11K according to a sixth embodiment. The current monitoring circuit 11K of FIG. 22 is different from the current monitoring circuit 11F of FIG. 17 in the following points.

(1) The switch SW12 and the constant current source IS24 are removed.

Differences will be described below.

In the current monitoring circuit 11K of FIG. 22 configured as described above, the current for generating the reference voltage Vref may be switched with the binary value between the predetermined current value I11 and the predetermined current value I12, so that the reference voltage Vref may be switched with the binary value of the predetermined voltage value V11 and the predetermined voltage value V12.

According to the sixth embodiment configured as described above, in addition to the above-described functions and effects, the same functions and effects as those of the first embodiment are obtained.

Seventh Embodiment

Figure 23:
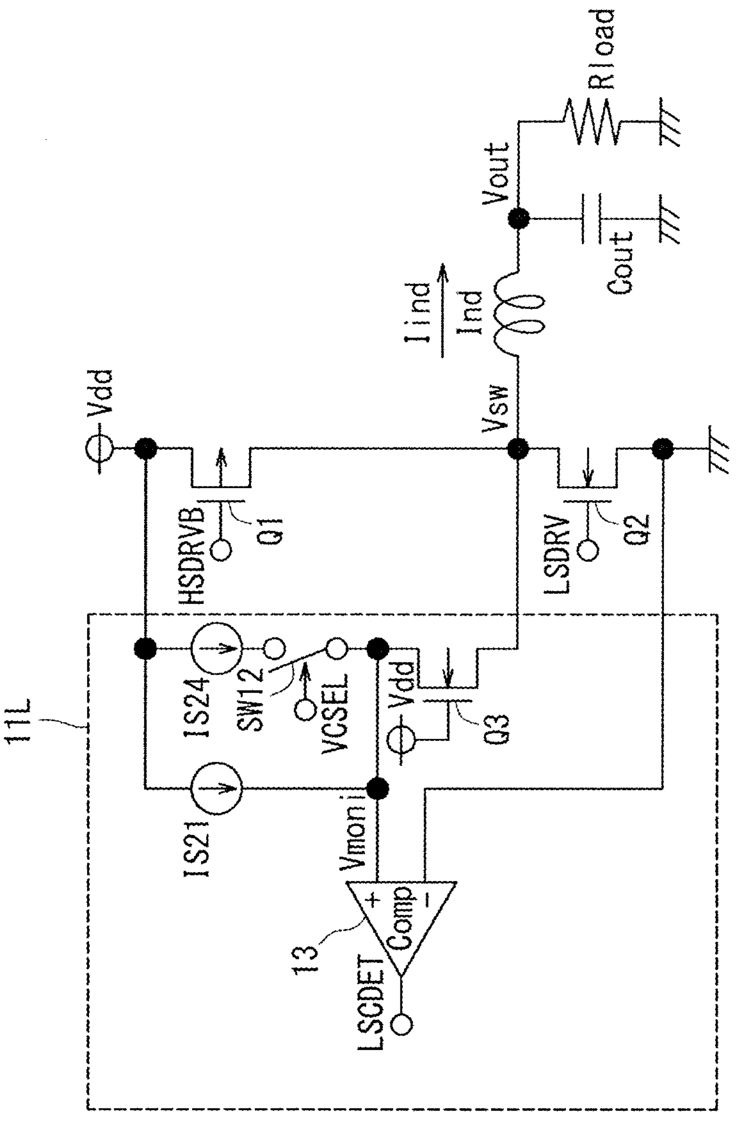
FIG. 23 is a block diagram illustrating a configuration example of a switching regulator including a current monitoring circuit 11L according to a seventh embodiment.

FIG. 23 is a block diagram illustrating a configuration example of a switching regulator including a current monitoring circuit 11L according to a seventh embodiment. The current monitoring circuit 11L of FIG. 23 is different from the current monitoring circuit 11F of FIG. 17 in the following points:

(1) The switch SW11, the constant current sources IS21 and IS22, and the MOS transistor Q4 are deleted.

(2) The inverting input terminal of the comparator 13 is grounded.

According to the seventh embodiment configured as described above, the same functions and effects as those of the first embodiment are obtained.

Eighth Embodiment

Figure 24:
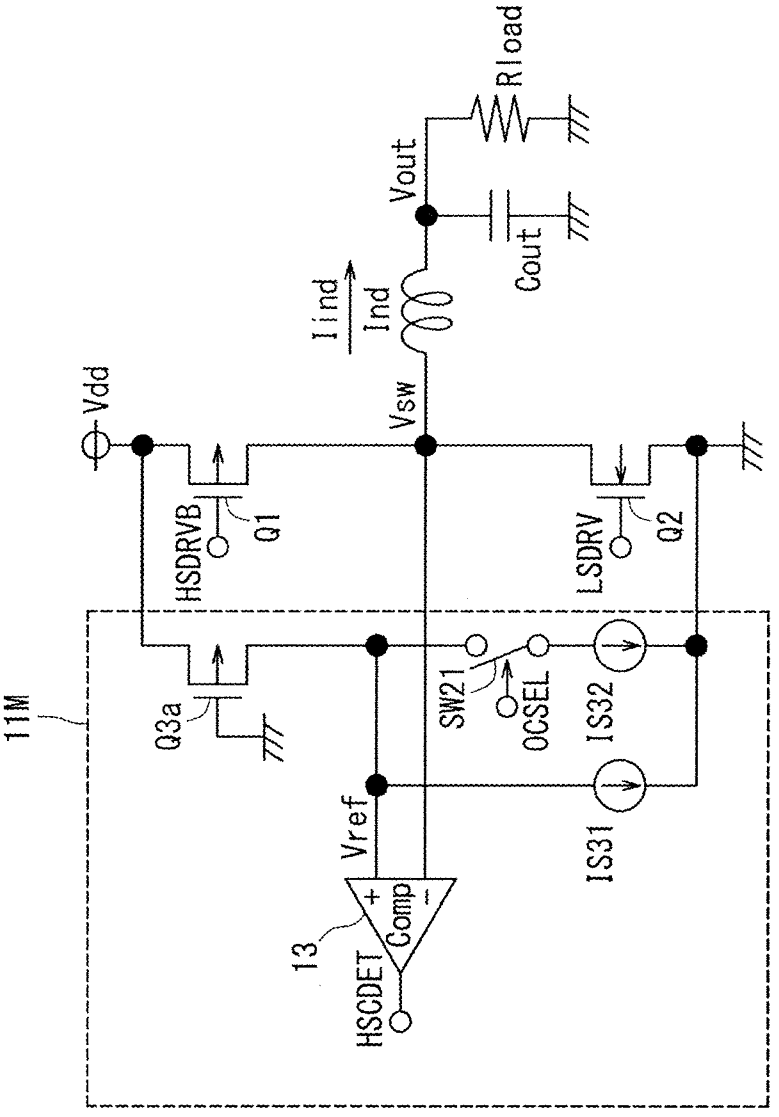
FIG. 24 is a block diagram illustrating a configuration example of a switching regulator including a current monitoring circuit 11M according to an eighth embodiment.

FIG. 24 is a block diagram illustrating a configuration example of a switching regulator including a current monitoring circuit 11M according to an eighth embodiment. The current monitoring circuit 11M of FIG. 24 is configured to include the comparator 13, constant current sources IS31 and IS32, a switch SW21, and a MOS transistor Q3*a*.

Referring to FIG. 24, the power supply voltage Vdd is connected to the non-inverting input terminal of the comparator 13 via the common-gate MOS transistor Q3*a*. The non-inverting input terminal of the comparator 13 is grounded via the constant current source IS31, and is grounded via the switch SW21 and the constant current source IS32. The switch SW21 is turned on or off based on the overcurrent selection signal.

In the current monitoring circuit 11M of FIG. 24 configured as described above, the current from the MOS transistor Q3*a* at the non-inverting input terminal of the comparator 13 is changed by turning on or off the switch SW21, and the reference voltage Vref is changed. The comparator 13 compares the switching voltage Vsw with the reference voltage Vref to output the comparison result signal HSCDET.

The current monitoring circuit 11M of FIG. 24 monitors the inductor current Iind when the current passes through the MOS transistor Q1 which is a high-side driver element.

According to the eighth embodiment configured as described above, effects similar to those of the first embodiment are obtained except for the above-described functions and effects.

Other Modified Embodiments

In the first to eighth embodiments described above, the MOS transistors Q1 and Q2 as a pair of switch elements are disposed outside the current monitoring circuits 11F to 11M, but the present invention is not limited thereto, and they may be incorporated in the current monitoring circuits 11F to 11M.

INDUSTRIAL APPLICABILITY

As mentioned above in details, according to the switching regulator according to an aspect of the present invention, it is possible to reduce the circuit area in the switching regulator as compared with the prior art while maintaining a high and stable quality.

The invention claimed is:

1. A switching regulator including a pair of switch elements connected in series to each other, the switching regulator comprising:

a comparator configured to compare a switching voltage corresponding to an inductor current flowing from the switching regulator to an inductor with a predetermined reference voltage, and output a comparison result signal;

a monitoring circuit configured to generate a first current for generating a monitoring voltage for monitoring the switching voltage;

a reference voltage circuit configured to generate a second current for generating the reference voltage; and a control circuit configured to generate and output a plurality of selection signals indicating a plurality of timings different from each other to at least one of the monitoring circuit and the reference voltage circuit, wherein at least one of the monitoring circuit and the reference voltage circuit changes the generated current in accordance with the plurality of timings, wherein at least one of the monitoring circuit and the reference voltage circuit is shared for the plurality of timings, wherein at least one of the monitoring circuit and the reference voltage circuit comprises a further circuit including a first constant current source, and a series circuit, which are connected in parallel to each other, and wherein the series circuit includes a second constant current source and a switch, which are connected in series to each other.

2. The switching regulator as claimed in claim 1, wherein a reference voltage of the reference voltage circuit has a generation point grounded via a MOS transistor having a gate to which a predetermined voltage is applied.

3. The switching regulator as claimed in claim 1, wherein a reference voltage of the reference voltage circuit has a generation point grounded via a resistor.

4. The switching regulator as claimed in claim 1, wherein a reference voltage of the reference voltage circuit has a generation point grounded.

5. A switching regulator including a pair of switch elements connected in series to each other, the switching regulator comprising:

a comparator configured to compare a switching voltage corresponding to an inductor current flowing from the switching regulator to an inductor with a predetermined reference voltage, and output a comparison result signal;

a monitoring circuit configured to generate a first current for generating a monitoring voltage for monitoring the switching voltage;

a reference voltage circuit configured to generate a second current for generating the reference voltage; and a control circuit configured to generate and output a plurality of selection signals indicating a plurality of timings different from each other to at least one of the monitoring circuit and the reference voltage circuit, wherein at least one of the monitoring circuit and the reference voltage circuit changes the generated current in accordance with the plurality of timings, wherein at least one of the monitoring circuit and the reference voltage circuit is shared for the plurality of timings, wherein each of the monitoring circuit and the reference voltage circuit includes a MOS transistor connected to a generation point of the monitoring voltage or the reference voltage and having a gate to which a first constant current source and a predetermined voltage are applied, and wherein application of the selection signal to a back gate of the MOS transistor results in changing a resistance value of the MOS transistor to change the monitoring voltage or the reference voltage.

* * * * *